United States Patent [19]

Tai et al.

[11] Patent Number: 5,313,309
[45] Date of Patent: May 17, 1994

[54] METHOD AND APPARATUS FOR PRINTING HALFTONES WITH A GRAY LEVEL PRINTER WITH CONTOUR SUPPRESSION AND/OR MINIMIZATION OF MOIRE PATTERNS

[75] Inventors: Hwai-Tzuu Tai, Rochester; Yee S. Ng, Fairport, both of N.Y.

[73] Assignee: Eastman Kodak Company, Rochester, N.Y.

[21] Appl. No.: 894,859

[22] Filed: Jun. 5, 1992

[51] Int. Cl.$^5$ .............................................. H04N 1/40
[52] U.S. Cl. .................................... 358/455; 358/456; 358/457; 358/458; 358/459; 358/465; 358/466
[58] Field of Search ............... 358/455, 456, 458, 465, 358/466, 462, 298, 457, 459

[56] References Cited

U.S. PATENT DOCUMENTS

| | | |
|---|---|---|
| 4,245,258 | 1/1981 | Holladay . |
| 4,945,422 | 7/1990 | Ng . |
| 4,959,730 | 9/1990 | Tai et al. ............... 358/456 |
| 4,963,990 | 10/1990 | Henderson et al. ................ 358/458 |
| 5,125,072 | 6/1992 | Ng . |
| 5,129,048 | 7/1992 | Ng . |

Primary Examiner—Edward L. Coles, Sr.
Assistant Examiner—Scott A. Rogers
Attorney, Agent, or Firm—Norman Rushefsky

[57] ABSTRACT

A method and an arrangement for reproducing an original image that has one or more different image type regions. The arrangement has a scanner which scans and digitizes the original image into pixels, a controller coupled to the scanner to receive the digitized original image, and which produces a first signal corresponding to a gray level halftoned representation of the digitized original image, and a printer coupled to the controller to receive the first signal and which produces a gray level halftoned reproduction of the original image. The controller operates the printer in a default mode when the original image contains a text region or a halftone region, this default mode including either contour suppression applied to every pixel of the original image, or using an output screen that is a higher frequency than a screen of the original image.

11 Claims, 11 Drawing Sheets

| LEVEL 1 | | | | LEVEL 5 | | | |
|---|---|---|---|---|---|---|---|
| 43 | 36 | 22 | 8 | 47 | 40 | 26 | 12 |
| 15 | ① | 29 | 50 | 19 | 5 | 33 | 54 |
| 22 | 8 | 43 | 36 | 26 | 12 | 47 | 40 |
| 29 | 50 | 15 | 1 | 33 | 54 | 19 | 5 |

| LEVEL 2 | | | | LEVEL 6 | | | |
|---|---|---|---|---|---|---|---|
| 44 | 37 | 23 | 9 | 48 | 41 | 27 | 13 |
| 16 | 2 | 30 | 51 | 20 | 6 | 34 | 55 |
| 23 | 9 | 44 | 37 | 27 | 13 | 48 | 41 |
| 30 | 51 | 16 | 2 | 34 | 55 | 20 | 6 |

| LEVEL 3 | | | | LEVEL 7 | | | |
|---|---|---|---|---|---|---|---|
| 45 | 38 | 24 | 10 | 49 | 42 | 28 | 14 |
| 17 | 3 | 31 | 52 | 21 | 7 | 35 | 56 |
| 24 | 10 | 45 | 38 | 28 | 14 | 49 | 42 |
| 31 | 52 | 17 | 3 | 35 | 56 | 21 | 7 |

| LEVEL 4 | | | |
|---|---|---|---|
| 46 | 39 | 25 | 11 |
| 18 | 4 | 32 | 53 |
| 25 | 11 | 46 | 39 |
| 32 | 53 | 18 | 4 |

| LEVEL 1 | | | | LEVEL 5 | | | |
|---|---|---|---|---|---|---|---|
| 7 | 6 | 4 | 2 | 39 | 38 | 36 | 34 |
| 3 | ① | 5 | 8 | 35 | 33 | 37 | 40 |
| 4 | 2 | 7 | 6 | 36 | 34 | 39 | 38 |
| 5 | 8 | 3 | 1 | 37 | 40 | 35 | 33 |

34 points to LEVEL 1

| LEVEL 2 | | | | LEVEL 6 | | | |
|---|---|---|---|---|---|---|---|
| 15 | 14 | 12 | 10 | 47 | 46 | 44 | 42 |
| [11] | [9] | [13] | 16 | 43 | 41 | 45 | 48 |
| [12] | [10] | 15 | 14 | 44 | 42 | 47 | 46 |
| 13 | 16 | 11 | 9 | 45 | 48 | 43 | 41 |

| LEVEL 3 | | | | LEVEL 7 | | | |
|---|---|---|---|---|---|---|---|
| 23 | 22 | 20 | 18 | 55 | 54 | 52 | 50 |
| 19 | 17 | 21 | 24 | 51 | 49 | 53 | 56 |
| 20 | 18 | 23 | 22 | 52 | 50 | 55 | 54 |
| 21 | 24 | 19 | 17 | 53 | 56 | 51 | 49 |

| LEVEL 4 | | | |
|---|---|---|---|
| 31 | 30 | 28 | 26 |
| 27 | 25 | 29 | 32 |
| 28 | 26 | 31 | 30 |
| 29 | 32 | 27 | 25 |

FIG. 6

| LEVEL 1 | | | | LEVEL 5 | | | |
|---|---|---|---|---|---|---|---|
| 31 | 26 | 16 | 6 | 35 | 30 | 20 | 10 |
| 11 | ① | 21 | 36 | 15 | 5 | 25 | 40 |
| 16 | [6] | 31 | 26 | 20 | 10 | 35 | 30 |
| 21 | 36 | 11 | 1 | 25 | 40 | 15 | 5 |

| LEVEL 2 | | | | LEVEL 6 | | | |
|---|---|---|---|---|---|---|---|
| 32 | 27 | 17 | 7 | 47 | 46 | 44 | 42 |
| 12 | 2 | 22 | 37 | 43 | 41 | 45 | 48 |
| 17 | 7 | 32 | 27 | 44 | 42 | 47 | 46 |
| 22 | 37 | 12 | 2 | 45 | 48 | 43 | 41 |

| LEVEL 3 | | | | LEVEL 7 | | | |
|---|---|---|---|---|---|---|---|
| 33 | 28 | 18 | 8 | 55 | 54 | 52 | 50 |
| 13 | 3 | 23 | 38 | 51 | 49 | 53 | 56 |
| 18 | 8 | 33 | 28 | 52 | 50 | 55 | 54 |
| 23 | 38 | 13 | 3 | 53 | 56 | 51 | 49 |

| LEVEL 4 | | | |
|---|---|---|---|
| 34 | 29 | 19 | 9 |
| 14 | 4 | 24 | 39 |
| 19 | 9 | 34 | 29 |
| 24 | 39 | 14 | 4 |

FIG. 7

| THRESHOLD LEVEL 1 | | | | THRESHOLD LEVEL 6 | | | | THRESHOLD LEVEL 11 | | | |
|---|---|---|---|---|---|---|---|---|---|---|---|
| 56 | 67 | 34 | 12 | 61 | 72 | 39 | 17 | 66 | 77 | 44 | 22 |
| 23 | 1 | 45 | 78 | 28 | 6 | 50 | 83 | 33 | 11 | 55 | 88 |
| 34 | 12 | 56 | 67 | 39 | 17 | 61 | 72 | 44 | 22 | 66 | 77 |
| 45 | 78 | 23 | 1 | 50 | 83 | 28 | 6 | 55 | 88 | 33 | 11 |

| THRESHOLD LEVEL 2 | | | | THRESHOLD LEVEL 7 | | | | THRESHOLD LEVEL 12 | | | |
|---|---|---|---|---|---|---|---|---|---|---|---|
| 57 | 68 | 35 | 13 | 62 | 73 | 40 | 18 | 94 | 95 | 92 | 90 |
| 24 | 2 | 46 | 79 | 29 | 7 | 51 | 84 | 91 | 89 | 93 | 96 |
| 35 | 13 | 57 | 68 | 40 | 18 | 62 | 73 | 92 | 90 | 94 | 95 |
| 46 | 79 | 24 | 2 | 51 | 84 | 29 | 7 | 93 | 96 | 91 | 89 |

| THRESHOLD LEVEL 3 | | | | THRESHOLD LEVEL 8 | | | | THRESHOLD LEVEL 13 | | | |
|---|---|---|---|---|---|---|---|---|---|---|---|
| 58 | 69 | 36 | 14 | 63 | 74 | 41 | 19 | 102 | 103 | 100 | 98 |
| 25 | 3 | 47 | 80 | 30 | 8 | 52 | 85 | 99 | 97 | 101 | 104 |
| 36 | 14 | 58 | 69 | 41 | 19 | 63 | 74 | 100 | 98 | 102 | 103 |
| 47 | 80 | 25 | 3 | 52 | 85 | 30 | 8 | 101 | 104 | 99 | 97 |

| THRESHOLD LEVEL 4 | | | | THRESHOLD LEVEL 9 | | | | THRESHOLD LEVEL 14 | | | |
|---|---|---|---|---|---|---|---|---|---|---|---|
| 59 | 70 | 37 | 15 | 64 | 75 | 42 | 20 | 110 | 111 | 108 | 106 |
| 26 | 4 | 48 | 81 | 31 | 9 | 53 | 86 | 107 | 105 | 109 | 112 |
| 37 | 15 | 59 | 70 | 42 | 20 | 64 | 75 | 108 | 106 | 110 | 111 |
| 48 | 81 | 26 | 4 | 53 | 86 | 31 | 9 | 109 | 112 | 107 | 105 |

| THRESHOLD LEVEL 5 | | | | THRESHOLD LEVEL 10 | | | | THRESHOLD LEVEL 15 | | | |
|---|---|---|---|---|---|---|---|---|---|---|---|
| 60 | 71 | 38 | 16 | 65 | 76 | 43 | 21 | 118 | 119 | 116 | 114 |
| 27 | 5 | 49 | 82 | 32 | 10 | 54 | 87 | 115 | 113 | 117 | 120 |
| 38 | 16 | 60 | 71 | 43 | 21 | 65 | 76 | 116 | 114 | 118 | 119 |
| 49 | 82 | 27 | 5 | 54 | 87 | 32 | 10 | 117 | 120 | 115 | 113 |

| THRESHOLD LEVEL 1 | | | | THRESHOLD LEVEL 2 | | | | THRESHOLD LEVEL 3 | | | | THRESHOLD LEVEL 4 | | | |
|---|---|---|---|---|---|---|---|---|---|---|---|---|---|---|---|
| 71 | 48 | 107 | 190 | 69 | 47 | 106 | 185 | 66 | 47 | 104 | 179 | 64 | 46 | 103 | 173 |
| 128 | 249 | 89 | 38 | 126 | 243 | 88 | 37 | 124 | 238 | 86 | 35 | 122 | 231 | 84 | 34 |
| 107 | 190 | 71 | 48 | 106 | 185 | 69 | 47 | 104 | 179 | 66 | 47 | 103 | 173 | 64 | 46 |
| 89 | 38 | 128 | 249 | 88 | 37 | 126 | 243 | 86 | 35 | 124 | 238 | 84 | 34 | 122 | 231 |

| THRESHOLD LEVEL 5 | | | | THRESHOLD LEVEL 6 | | | | THRESHOLD LEVEL 7 | | | | THRESHOLD LEVEL 8 | | | |
|---|---|---|---|---|---|---|---|---|---|---|---|---|---|---|---|
| 61 | 45 | 101 | 167 | 59 | 44 | 100 | 161 | 57 | 44 | 98 | 156 | 54 | 43 | 97 | 153 |
| 120 | 224 | 83 | 34 | 118 | 217 | 82 | 33 | 116 | 212 | 80 | 32 | 114 | 209 | 79 | 32 |
| 101 | 167 | 61 | 45 | 100 | 161 | 59 | 44 | 98 | 156 | 57 | 44 | 97 | 153 | 54 | 43 |
| 83 | 34 | 120 | 224 | 82 | 33 | 118 | 217 | 80 | 32 | 116 | 212 | 79 | 32 | 114 | 209 |

| THRESHOLD LEVEL 9 | | | | THRESHOLD LEVEL 10 | | | | THRESHOLD LEVEL 11 | | | | THRESHOLD LEVEL 12 | | | |
|---|---|---|---|---|---|---|---|---|---|---|---|---|---|---|---|
| 53 | 42 | 95 | 151 | 51 | 41 | 94 | 146 | 50 | 40 | 92 | 142 | 49 | 40 | 91 | 135 |
| 113 | 205 | 78 | 31 | 111 | 202 | 77 | 30 | 110 | 198 | 75 | 29 | 108 | 195 | 74 | 28 |
| 205 | 151 | 53 | 42 | 94 | 146 | 51 | 41 | 92 | 142 | 50 | 40 | 91 | 135 | 49 | 40 |
| 78 | 31 | 113 | 205 | 77 | 30 | 111 | 202 | 75 | 29 | 110 | 198 | 74 | 28 | 108 | 195 |

| THRESHOLD LEVEL 13 | | | | THRESHOLD LEVEL 14 | | | | THRESHOLD LEVEL 15 | | | | THRESHOLD LEVEL 16 | | | |
|---|---|---|---|---|---|---|---|---|---|---|---|---|---|---|---|
| 19 | 18 | 22 | 25 | 12 | 12 | 14 | 15 | 9 | 8 | 10 | 11 | | | | |
| 24 | 27 | 20 | 17 | 15 | 16 | 13 | 12 | 11 | 11 | 10 | 8 | | | | |
| 22 | 25 | 19 | 18 | 14 | 15 | 12 | 12 | 10 | 11 | 9 | 11 | | | | |
| 20 | 17 | 24 | 27 | 13 | 12 | 15 | 16 | 10 | 8 | 11 | 11 | | | | |

METHOD AND APPARATUS FOR PRINTING HALFTONES WITH A GRAY LEVEL PRINTER WITH CONTOUR SUPPRESSION AND/OR MINIMIZATION OF MOIRE PATTERNS

This invention is related to the following applications, filed on even date with the present application: Ser. No. 07/894,858, for Classification to Change Exposure Within a Cell of Different Pixels; Ser. No. 07/894,857, for Halftone Dot Arrangement in Gray Level Halftone Printing; Ser. No. 07/895,555 and now U.S. Pat. No. 5,200,831; for a Method and Arrangement For Locally Switching Gray Dot Types to Reproduce an Image With Gray Level Printing; Ser. No. 07/895,986 and now U.S. Pat. No. 5,239,390, for An Image Processing Method to Remove Halftone Screens; Ser. No. 07/895,985 and now U.S. Pat. No. 5,204,755, for Multi-Bit Rendering Method and Arrangement for Continuous Tone Picture Representation and Printing; Ser. No. 07/895,554, for A Method and Apparatus For Imbedding Controlled Structure For Gray Scale Rendering; and Ser. No. 07/895,988, for Line Screen Design for Gray Scale Rendering. Each of these related applications is hereby expressly incorporated by reference into this application.

FIELD OF THE INVENTION

The present invention relates to the field of encoding pictorial imagery for reproduction on display or printing systems, and more particularly, to a method and apparatus for providing a default mode to a digital reproduction machine such that text input, halftone input and continuous tone input are all reproduced satisfactorily.

BACKGROUND OF THE INVENTION

In the area of digital printing (the term "printing" is used to encompass both printing and displaying throughout), gray level has been achieved in a number of different manners. The representation of the intensity, i.e., the gray level, of a color by binary displays and printers has been the object of a variety of algorithms. Binary displays and printers are capable of making a mark, usually in the form of a dot, of a given, uniform size and at a specified resolution in marks per unit length, typically dots per inch. It has been common to place the marks according to a variety of geometrical patterns such that a group of marks when seen by the eye gives a rendition of an intermediate color tone between the color of the background (usually white paper stock) and total coverage, or solid density.

Continuous tone images contain an apparent continuum of gray levels. As an approximation to continuous tone images, pictorial imagery has been represented via binary halftone technologies. In order to record or display a halftone image with a scanning system, one picture element of the recording or display surface consists of a $j \times k$ matrix of sub-elements where $j$ and $k$ are positive integers. A halftone image is reproduced by printing the respective sub-elements or leaving them blank, in other words, by suitably distributing the printed marks.

Halftone image processing algorithms are evaluated in part, by their capability of delivering a complete gray scale at normal viewing distances. The capability of a particular process to reproduce high frequency rendition (fine detail) with high contrast modulation makes that procedure superior to one which reproduces such fine detail with lesser or no output contrast.

Another method of producing gray levels is provided by gray level printing. In such a method, each pixel has the capability to render several different dot sizes. The dot size for a pixel is a function of the exposure time provided an LED element corresponding to that pixel. The longer the exposure time, the more toner is attracted to that particular pixel. See, for example, U.S. Pat. No. 4,680,645 for a method of rendering gray scale images with variable dot sizes.

There are two major concerns in rendering a continuous tone image for printing: (1) the resolution of image details, and (2) the reproduction of gray scales. In a binary halftone representation scheme, these two fundamental factors compete with each other. The more gray levels that are rendered, the larger is the halftone cell. Consequently, coarse halftone line screens are provided, with the attendant poor image appearance. Hence, a compromise is made in rendering between the selection of line resolution and gray scales in binary halftone printing. However, in gray level halftone printing, one can satisfy both resolution and gray level requirements. In gray level printing, the same number of addressable dots are present, and there is a choice of dot sizes from one dot-size of bit/pixel to 16 different dot-sizes of 4 bit/pixel. An image could then be rendered with 133 line screens and 128 gray scales of higher quality image. Although providing higher image quality with respect to line resolution and tonal scales, gray level halftoning presents its own dot rendering issues.

A problem exists in the application of a gray level rendering technique to a document that contains different types of images: text, halftone, and continuous tone. These different types of images create different rendering problems, based on a trade-off between tone scales and detail resolution. For example, with text, the number of tone scales is not as important as providing a smooth text edge, whereas the opposite holds true for continuous tone images. Providing a single type of gray level halftone rendering technique to a document that contains two or more types of images may lead to the production of a document in which one or more of the different types of images are reproduced unsatisfactorily.

There is a need for a rendering technique that takes advantage of the line resolution and tonal scales provided by gray level halftoning in reproducing images.

SUMMARY OF THE INVENTION

This and other needs are met by the present invention which provides an arrangement for reproducing an original image, this original image having one or more different image type regions, comprising a scanner which scans and digitizes the original image into pixels, a controller coupled to the scanner to receive the digitized original image, and which produces a first signal corresponding to a gray level halftoned representation of the digitized original image, and a printer coupled to the controller to receive the first signal and produce a gray level halftoned reproduction of the original image. The controller includes means for operating the printer in a default mode when the original image contains a text region or a halftone region, this default mode including contour suppression applied to every pixel of said original image.

In preferred embodiments, each pixel has an input pixel gray value and is assigned an output gray level by the means for operating the printer in a default mode, and the contour suppression includes assigning for input pixel gray values that are between first and second output gray levels a probability of having the first output gray level and a probability of having the second output gray level.

This method of contour suppression delivers more accurate tone and eliminates false contouring due to large differences between the output gray levels.

The earlier stated needs are also met by the present invention which provides an arrangement for reproducing an original image, this original image having one or more different image type regions, comprising a scanner which scans and digitizes the original image into pixels, a controller coupled to the scanner to receive the digitized original image, and which produces a first signal corresponding to a gray level halftoned representation of the digitized original image, and a printer coupled to the controller to receive the first signal and which produces a gray level halftoned reproduction of the original image. The controller includes means for operating the printer in a default mode when the original image contains a text region or a halftone region, this default mode including reproducing the original image with an output screen that is higher in frequency than a frequency of a screen of the original image.

Other objects, advantages and novel features of the present invention will become apparent from the following detailed description of the invention when considered in conjunction with the accompanying drawings.

DETAILED DESCRIPTION OF THE DRAWINGS

Figures 1, 2:
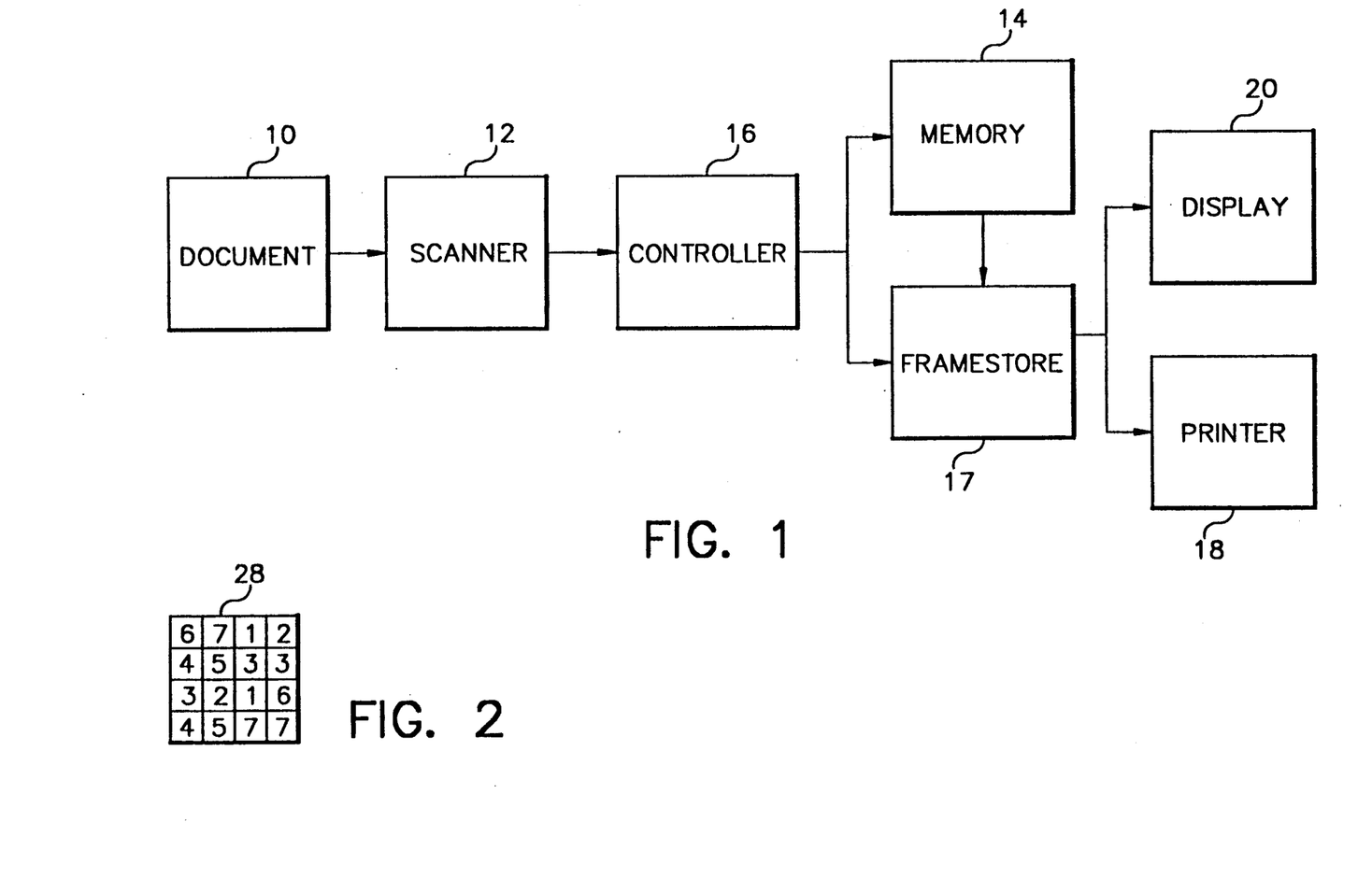
FIG. 1 shows a block diagram of an arrangement for reproducing an image, constructed in accordance with an embodiment of the present invention.
FIG. 2 shows an example of a 4×4 cell with indications of gray level for each pixel.

FIG. 1 illustrates an arrangement which reproduces a document. The document 10 can contain different types of images on the same document. For example, document 10 may contain both text and continuous tone areas, and may also contain halftone areas.

The document 10 is scanned in and digitized by a conventional scanner 12, which operates to provide digital signals representative of the densities of the areas of the document 10 corresponding to a pixel. These signals are sent to a memory (or buffer) 14. Under the direction of a controller 16, these signals may be modified and provided as gray level signals through a framestore 17 to a printer 18 and/or a display 20 for each pixel. The printer 18 and/or display 20 will then reproduce the document 10 by energizing each of the individual pixels according to the gray levels as modified (or not modified) by the controller 16. The memory 14, the controller 16, the framestore 17, the printer 18 and the display 20 are of conventional hardware design.

In gray level printing, each pixel has the capability to render several different dot sizes, and thus different gray levels. However, instead of simply providing each pixel with an independent gray level, several pixels may be organized together to form a superpixel, or cell. Each of the pixels in a cell is then provided with a gray level. The human visual response integrates the various gray levels of the individual pixels in the cell to a single perceived gray level for the cell. This is similar to the basic concept of binary halftoning. The number of tone scales for a cell is increased greatly, however, due to the number of different gray levels available for each pixel. For example, instead of only the two levels provided in binary halftoning for each pixel, eight levels can be provided with gray level printing for each pixel in a cell (3 bits/pixel). When the cell is made up of 4×4 pixels, for example, the gray level printing allows 121 different gray shades to be rendered for that cell. An example of a 4×4 cell 28 with numbers that represent gray levels for each pixel is shown in FIG. 2.

The formation of the dots in the pixels of a cell can be performed in a number of different manners to achieve different desired results. The dots can be formed as "full" dot, "partial" dot, or "mixed" dot to provide gray level halftoning.

Figure 3:
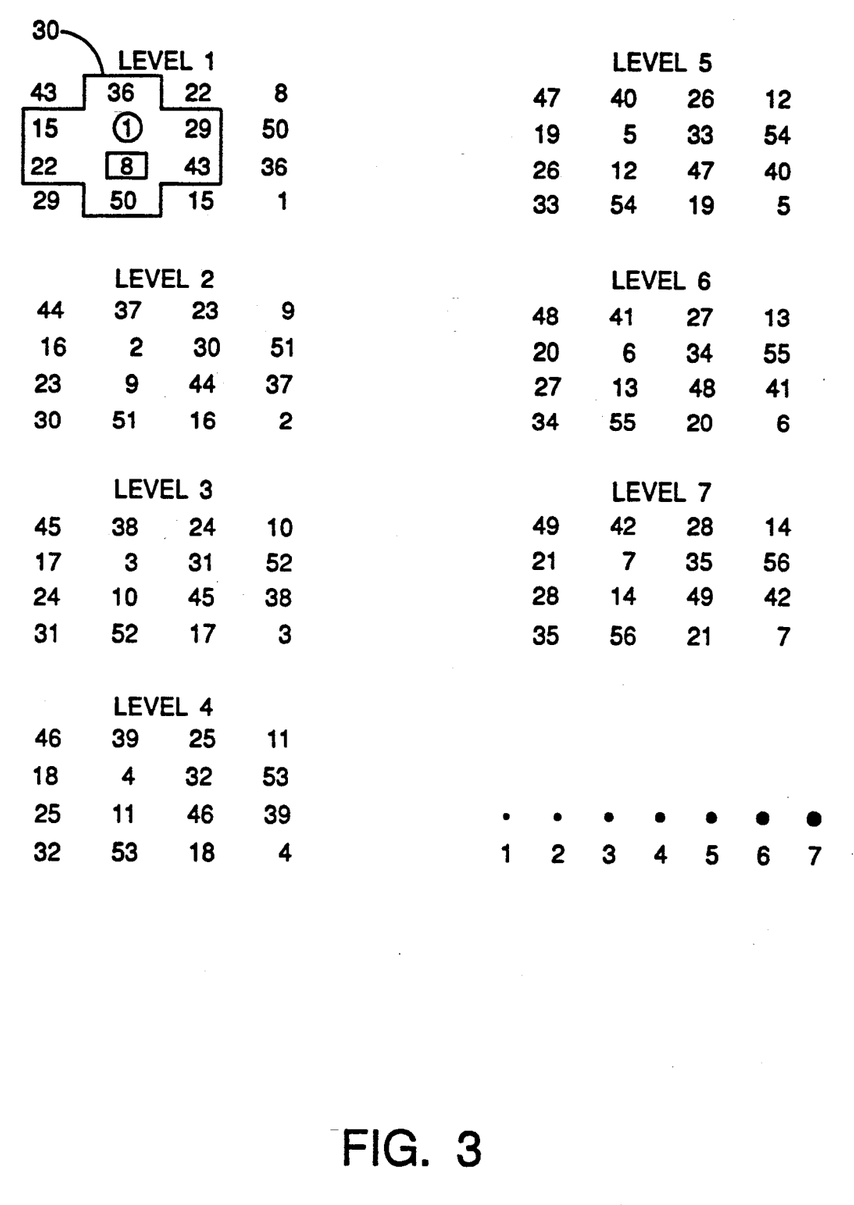
FIG. 3 illustrates an exemplary 3-bit gray halftone dot layout according to a full dot type embodiment of the present invention.

FIG. 3 illustrates an example of a 3-bit gray halftone dot layout for a full dot type formation. Also illustrated are seven different pixel-dot sizes, corresponding to the sizes that each individual pixel-dot can obtain. There are 57 possible gray levels for the exemplary eight element cell 30 shown here. An example of the formation of a cell that is at gray level 12 will now be given.

The pixel circled in level 1, reference numeral 1, is formed to dot-size 1 in level 1. (Only one cell will be described, although the pixels of other cells will be changed according to the same layout, as shown in FIG. 3). The dot at this pixel grows larger and larger as the levels increase from level 1 to level 2 all the way to level 7. One can see that this circled pixel increases in value from 1 to 7 as the levels increase. If the desired gray level for the cell 30 was 7, then the formation of dots would be completed once the circled pixel has reached the dot-size of 7 in level 7. In this example, however, the gray level for the cell 30 is desired to be 12. At gray level 17, the circled pixel has reached its maximum dot-size, so that a dot at another pixel must now start forming. This dot starts forming at the pixel indicated with a square around it in level 1, with the numeral 8.

Figure 4:
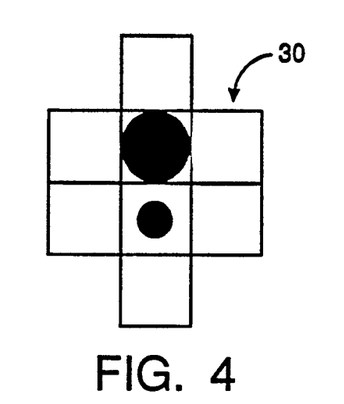
FIG. 4 shows a cell with dots that have been formed.

The dot formation process continues, with the dot at this second pixel growing larger and larger as the levels again increase from level 1 to level 5. The formation process stops at level 5, since the pixel has now reached the value of 12. The halftone cell 30 now contains, as seen in FIG. 4, a dot of dot-size 7, and a dot of dot-size 5. The extension of this formation process to 57 gray levels is easy to see from this example.

Figure 5:
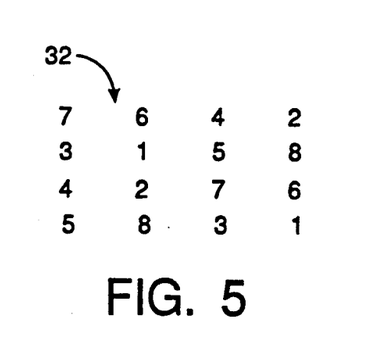
FIG. 5 illustrates an exemplary halftone dot mask.

The full dot type process thus involves forming dots at the highest priority pixels to their maximum allowable dot-size before beginning the formation of the dots at the next highest priority pixels. An exemplary halftone dot mask 32 with pixel priorities indicated is shown in FIG. 5. Different matrix sizes, cell shapes and priorities can be used for the cells than that illustrated in FIG. 3, without departing from the spirit and scope of the present invention.

In the electrophotographic process, the full dot type formation process is favored because it forms stable dots and exhibits less granularity (halftone printing noise). Another method which carries more information detail than full dot, but at the cost of less stable dots, is the partial dot type, described below.

Figure 6:
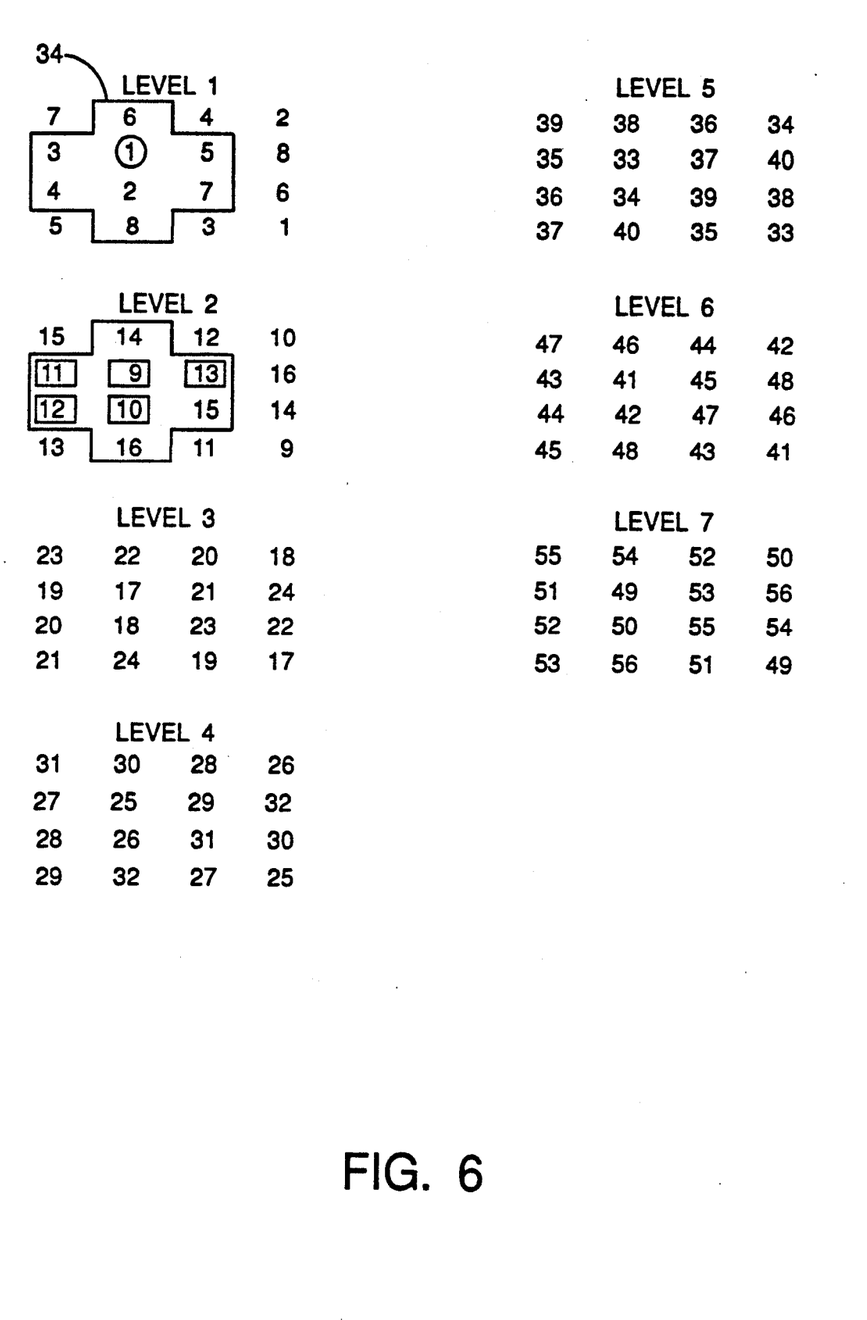
FIG. 6 shows a 3-bit gray halftone dot layout according to a partial dot type embodiment of the present invention.

A 3-bit gray halftone dot layout for the partial dot type formation process is shown in FIG. 6. In this process, the cell 34 is built by providing a dot of the same size to each pixel in the cell to the extent possible, before building up the dot at any particular pixel to the next larger size. Thus, for a gray level of 6 for the cell 34, the circled pixel in level 1 would have a dot formed at that pixel with a dot-size of 1. For larger gray levels, for example gray level 13, each of the pixels in the cell 34 would be built up to at least dot-size of 1. The pixels indicated with a square around them in level 2 would be built up to have a dot-size of 2.

The partial dot formation process can thus be seen to spread out the information over the cell, and therefore carries more information detail than the full dot. It does suffer from less stable dots and more granularity, however.

The mixed dot type, discussed below, combines the merits of both the full dot and the partial dot types in gray level halftoning. A number of different processes can be provided to combine the full dot type and the partial dot type, with the specific mixed dot type being chosen based on which renders an image with more smoothness, less graininess, and more image details. Suggested strategies are: 1) build small stable dots in the highlight (toe) region; 2) keep tone response linear in the mid-tone region; 3) reduce dot structure in the shadow (shoulder) region and render more details. Based on these considerations, a specific mixed dot type can be chosen by one of ordinary skill in the art to optimize stable dots, more image detail and less graininess.

Figure 7:
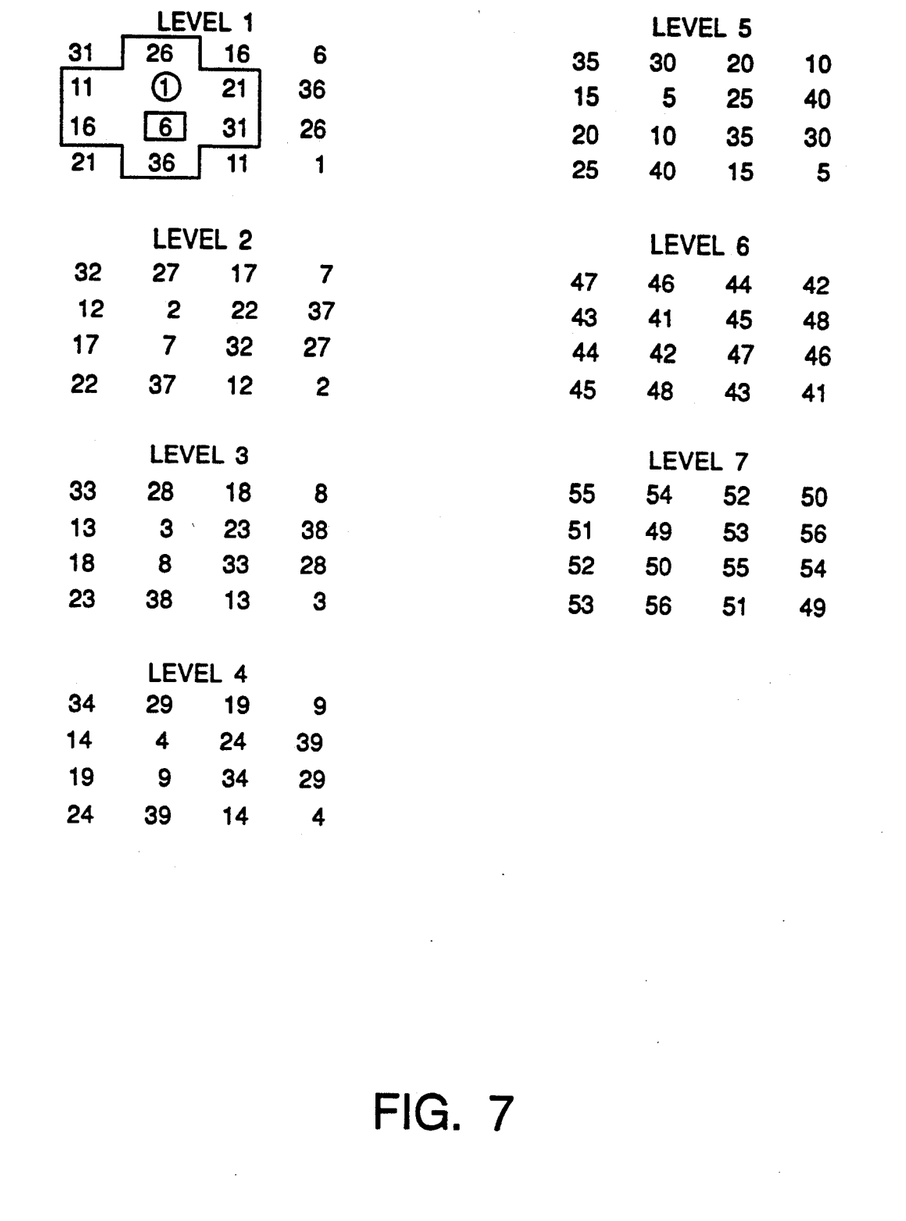
FIG. 7 shows a 3-bit gray halftone dot layout according to a mixed dot type embodiment of the present invention.

An example of a specific mixed dot type 3-bit gray halftone dot layout is illustrated in FIG. 7. As can be seen, until gray level 41 is reached, the pixels are constrained from growing beyond dot-size of 5. The pixels grow in a full dot type process, with the pixel circled growing to a dot-size of 5, with the pixel that is squared then starting to grow in size. Once all of the pixels in the cell have attained a dot-size of 5, corresponding to gray level 40, the cell then increases in gray level by using a partial dot type process. In other words, each of the pixels in the cell must grow to a dot-size of 6 before any of the pixels begins growing to a dot-size of 7.

Figure 8:
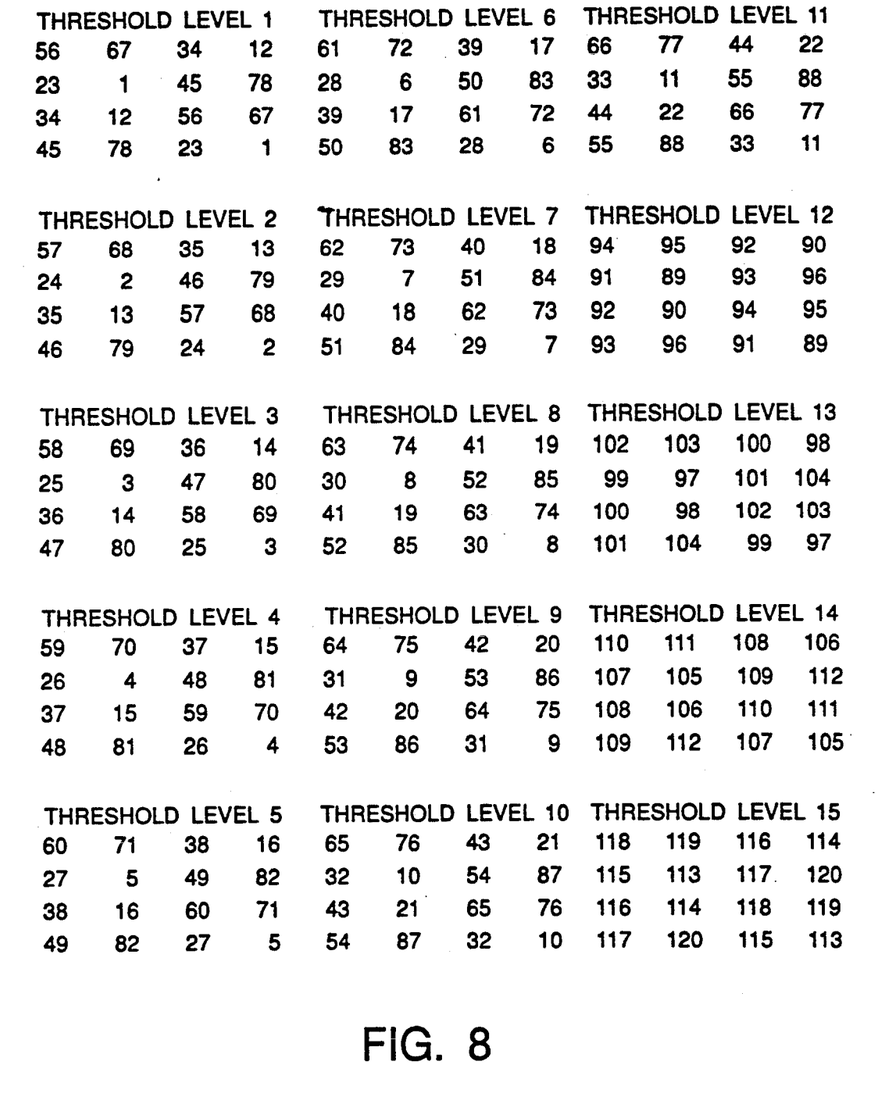
FIG. 8 shows a 4-bit gray halftone dot layout according to a mixed dot type embodiment of the present invention.

An example of a 4-bit gray halftone dot layout for mixed dot type is illustrated in FIG. 8. The formation of the dots is the same in concept to that illustrated in FIG. 7. Because there are 15 dot sizes available for each pixel, 121 gray levels for an eight element cell are obtainable.

Figure 9:
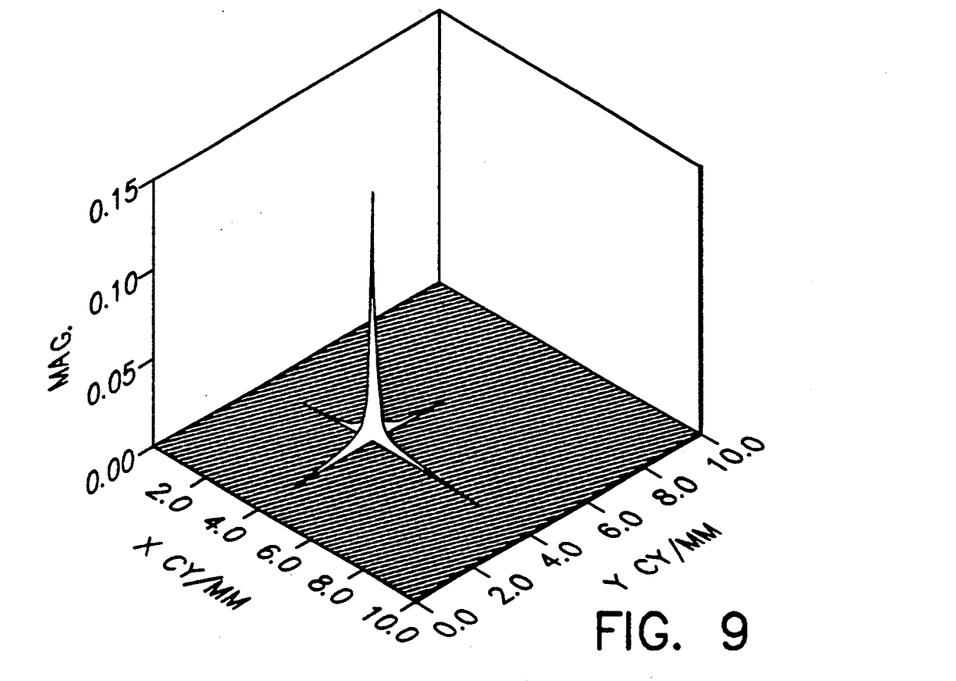
FIG. 9 shows a power spectrum of an output print of a black density patch with full dot type.
Figure 10:
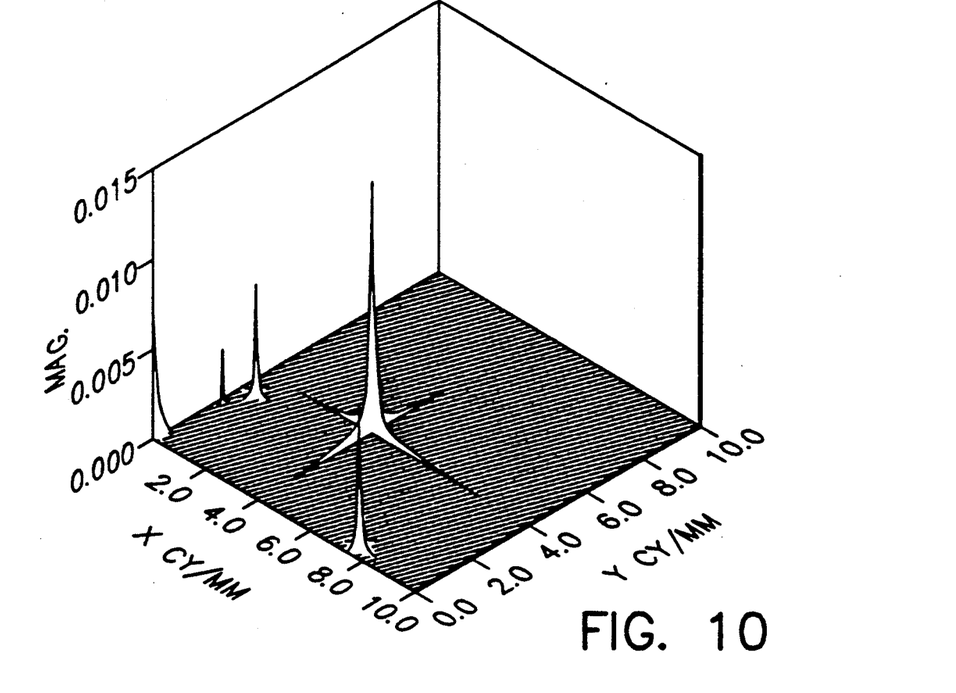
FIG. 10 shows a power spectrum of an output print of a black density patch with partial dot type.

With photographic input and digital scanning at 400 dpi, the inventors have been successful in using gray level halftone at 141/inch screen (45 degree) of the mixed dot type to represent output images with a gray level printing system at 400 dpi output resolution. The gray level halftone is tuned to balance between the visibility of the fundamental screen and the granularity of the system for a particular process. In this exemplary embodiment, 12 microns toner with electrostatic transfer is used. A power spectrum of an output print of a 0.8 black density patch with full dot type is shown in FIG. 9. As one can see, the fundamental frequency at 141/inch screen is very prominent but the granularity is low. At the other extreme, the power spectrum of an output density patch (at a similar density to the full dot) of a partial dot type is shown in FIG. 10. In this figure, the fundamental frequency is no longer very prominent, yet granularity is higher (due to a change in the plotting scale, it is difficult to see the granularity change, but this change is indicated by the data). A compromise is made with the mixed dot halftone as shown in the power spectrum of FIG. 11 which has a significant reduction of the fundamental frequency and yet is very similar in granularity to that of the full dot type.

Figure 11:
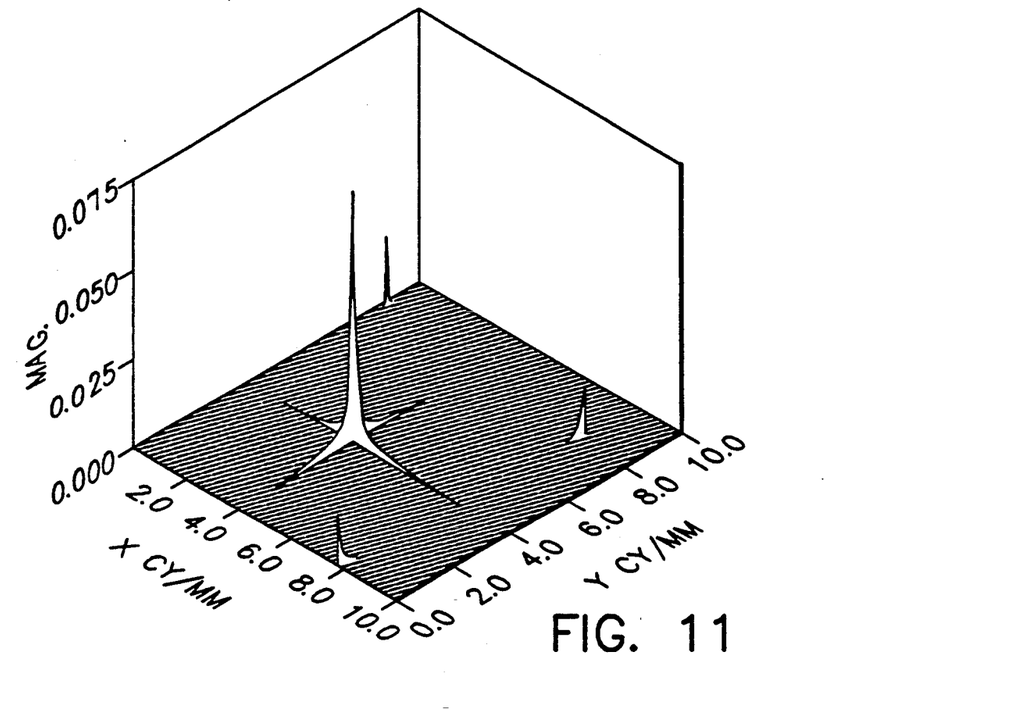
FIG. 11 shows a power spectrum of an output print of a black density patch with mixed dot type.

What can be concluded from FIGS. 9–11 is that for large toner particle size, a fundamental screen frequency is desirable to stabilize the system and reduce granularity. But when reducing the visual sensation for the screen (to make the system more continuous tone like), one wants to have a weaker screen. Also if the input is a halftone screen itself, it is desirable to have a weak output screen (or no screen at all), so as to reduce moire effects.

For continuous tone input, the output images using the mixed dot type with a 141/inch screen (45 degree) exhibit a fine balance between sharpness, granularity and screen texture. However, if the input to the scanner is a halftone (in this case a 150/inch screen picture), then using this output screen (which is good for continuous tone pictorial input) will create a strong moire pattern. Furthermore, if the input is high quality text and graphics, the 141/inch may break up the fine structures and may not be desirable.

Therefore, for digital copying, the situation can be summarized as follows. For photographic continuous tone input, it may be desirable to have a photographic mode which reduces granularity and stabilizes the system with a 141/inch screen. This screen has the advantages of lower grain, higher sharpness, a weak screen and a stable process. The disadvantages include moire patterns with halftone inputs, and broken lines for fine line graphics and text. One may therefore use a default mode for the digital copier which will be able to handle halftone input, text/graphics input and continuous tone input reasonably well. There are many approaches to providing a default mode. One method is segmentation and descreening, which requires extensive pre-processing and text/picture/halftone segmentation in real time. A second method uses gray level error diffusion and provides high resolution scanning and no moire for halftone input. However, this method suffers from grainy images for continuous tone input as well as being difficult to implement in a look up table approach for accurate color reproduction.

The present invention provides two different methods for providing a default mode that produces satisfactory images for each of the different image types. The first of these is termed "contour suppression/pixel" and the second is termed "higher screen frequency".

Figure 12:
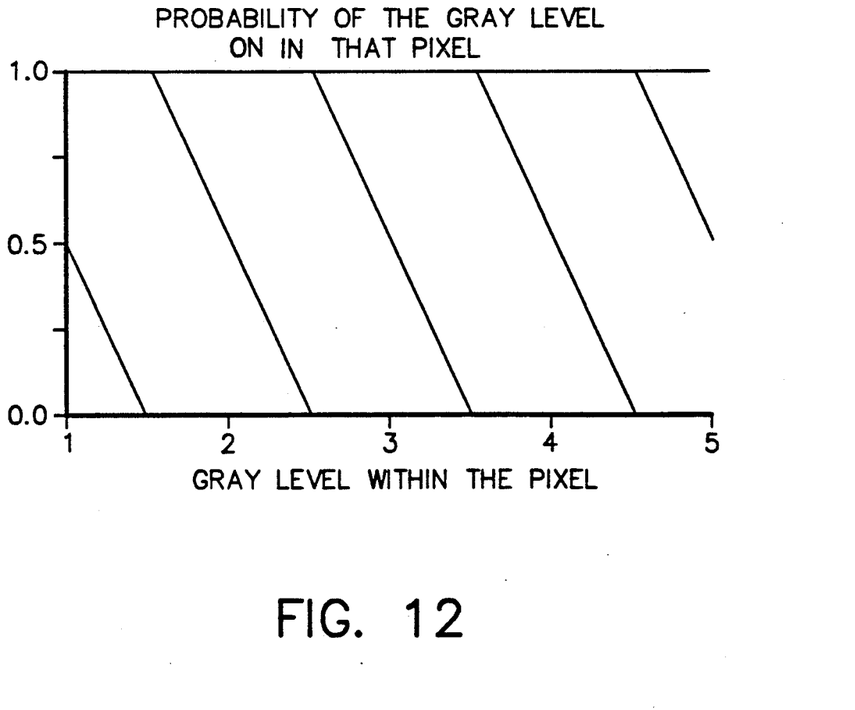
FIG. 12 shows contour suppression of every pixel.

The contour suppression/pixel method of providing a default mode is shown in FIG. 12. In this method, contour suppression is applied to every input pixel. For example, assume that there are 16 gray levels (4 bits) within one pixel and the input data value is just at gray level 3. Then gray level 3 will have a 50% probability to be on, but gray levels 4 to 16 will have a 100% probability to be on and gray levels 1 and 2 will have a 0% probability to be on. When a halftone input (150/inch screen) is used in this case with a 400 dpi gray level writer, the moire is reduced significantly. Here the original halftone is in fact stabilizing tone reproduction with this per pixel contour suppression method.

Figure 15:
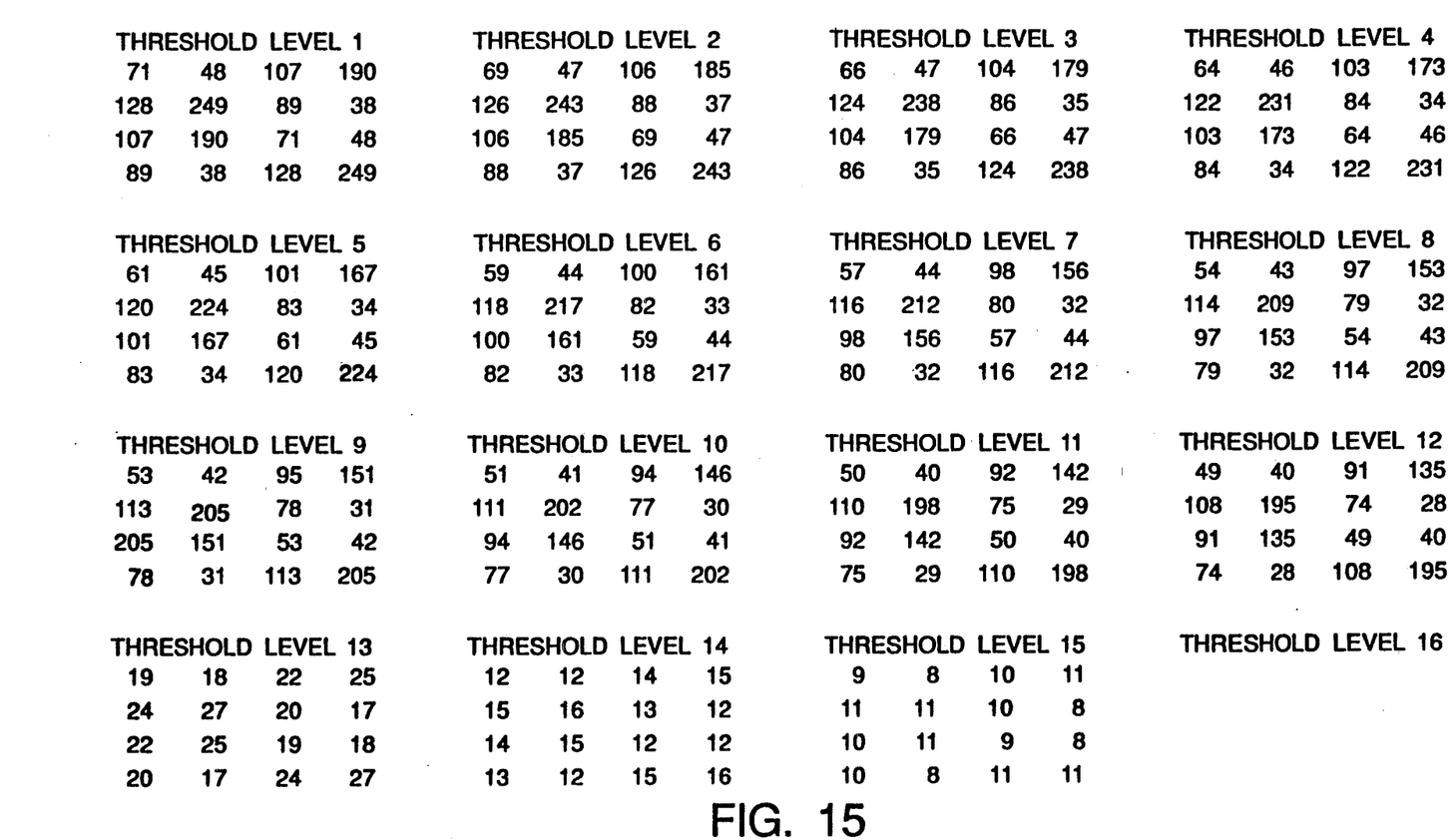
FIG. 15 illustrates a thresholding mask for a 4-bit gray halftone dot layout according to a mixed dot type embodiment of the present invention.
Figure 16:
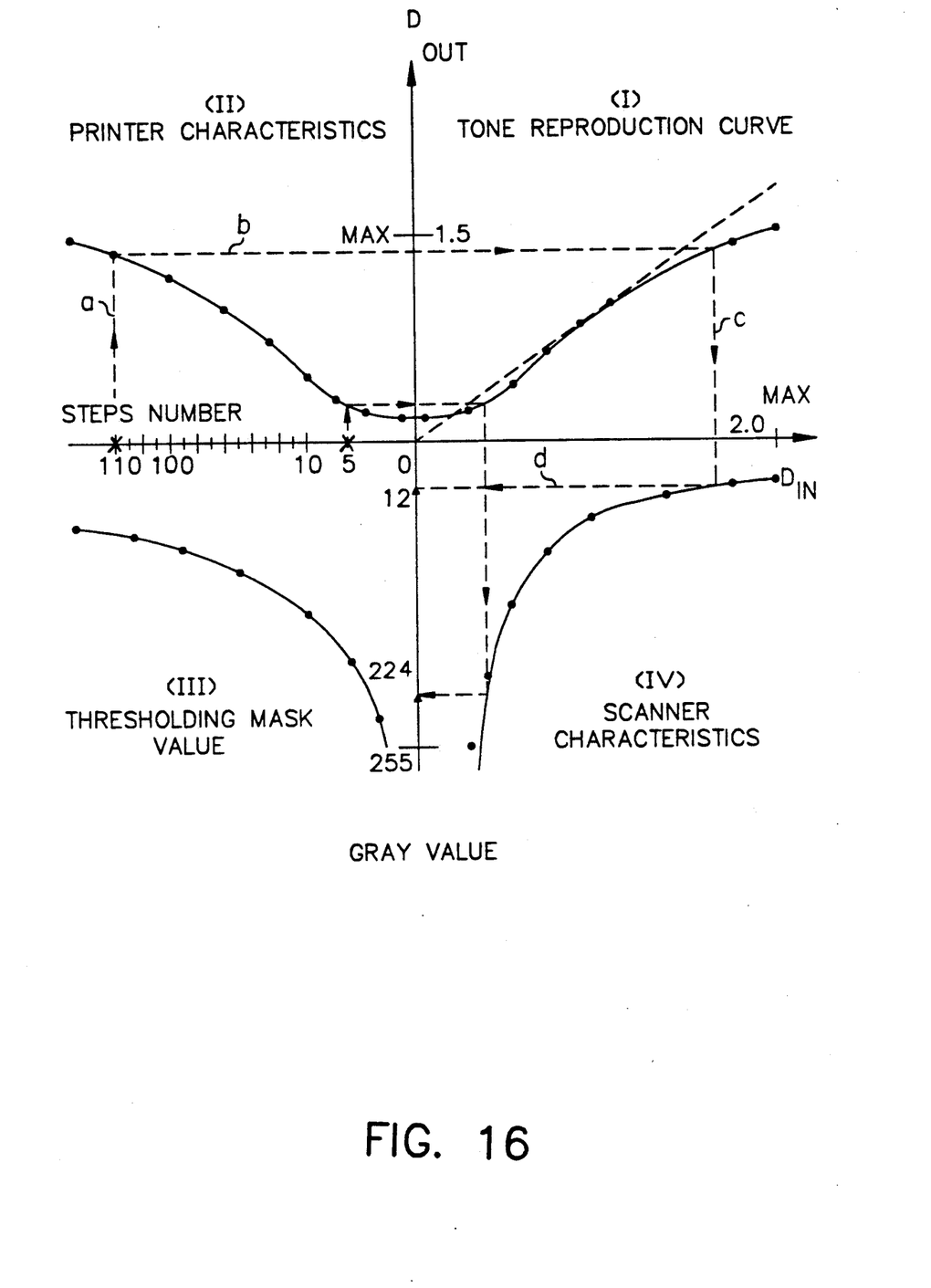
FIG. 16 shows a tone reproduction control chart.

The contour suppression/pixel method will be further explained with an example below. First, the generation of a threshold mask will be described. A 4-bit mixed dot type thresholding mask is illustrated in FIG. 15. This thresholding mask is derived from a dot layout, such as shown in FIG. 8 for the mixed dot type, using a tone reproduction control chart, such as shown in FIG. 16. The tone reproduction chart has four quadrants. The first quadrant (I) contains the input and output density of a specific tone reproduction curve, which specifies the gamma or the contrast of the image to be reproduced. The second quadrant (II) captures the characteristics of the gray level printing process. The fourth quadrant (IV) preserves the characteristics of the scanner, which converts the density to a gray value. The third quadrant (III) maps gray values into gray steps linking the quadrants IV, I and II together.

To determine a thresholding mask value using this chart, the step number of the dot sequence in the dot layout of a cell is replaced by a gray value. For example, for step number 110 (found in threshold level 14 of FIG. 8 for the mixed dot type) the mapping along arrows a, b, c, and d provides the gray value of 12. Similarly, for step number 5, the gray value maps to 224. (The values of the step number and the gray values are inversely related). In this manner, the thresholding masks of FIG. 15 is derived.

The thresholding mask is used to determine what the gray level of an output pixel should be given corresponding to its input pixel gray value. Assume, for example, that the input image pixel at location (1,1) of the 4×4 matrix cell of FIG. 15 has a gray value of 56. The 15 thresholding values at the (1,1) location of the 4×4 cell are:

71, 69, 66, 64, 61, 59, 57, 54, 53, 51, 50, 49, 19, 12, and 9.

Since the input image pixel has a gray value of 56, which is between the two threshold values 57 and 54, the output gray level 7 is given to that pixel in the conventional method. Hence, that input image pixel with value 56 at location (1,1) will have a probability of gray level 7 being on of 100%. Similarly, the same output gray level 7 will also be given to an image input pixel with a gray value of 55. In the present invention, however, contour suppression does not involve assigning 100% probability to all pixel values in between the thresholds. Instead, the probability is made proportional to the difference of the pixel value relative to the thresholds. For example, the value 56 will not have gray output level 7 all of the time. If the probability is set to 80%, then this pixel will be output with gray level 7 80% of the time, and with gray level 8 20% of the time.

This method of contour suppression, which does not fix the probability of a specific gray level being on at 100% for values between thresholds, but rather makes it a function of the difference of the pixel value relative to the thresholds, delivers more accurate tone and eliminates false contouring due to large differences between threshold values.

The contour suppression/pixel method used on scanned in text also shows high resolution. Therefore the system should be able to preserve images whether it is a halftone input or high resolution text/graphics input and has been going through the copying process more than once (recopying). However, if the method is used on continuous tone input, the output can be grainy. In this case, the contour suppression scheme does reduce density contouring compared with a straight threshold value matrix in gray level printing. Further improvement includes passing the original image through an 8 bits to 4 bits conversion type of Bayer matrix to give the system more gray levels, thereby eliminating contours.

Figure 13:
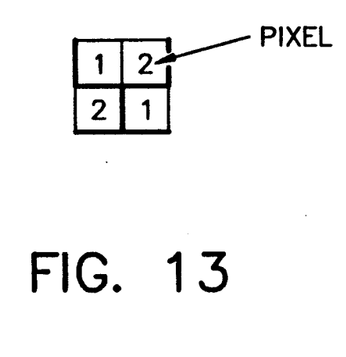
FIG. 13 illustrates a 282/inch (45 degree screen).
Figure 14:
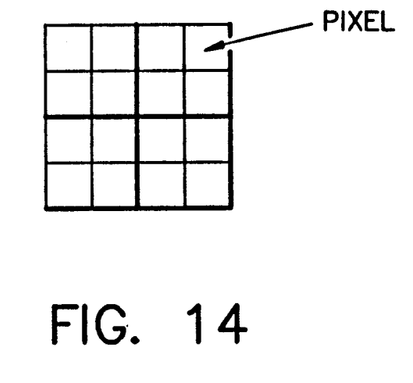
FIG. 14 illustrates a 200/inch (90 degree screen).

The second method of the present invention uses a higher output screen such as a 282/inch (45 degree screen) shown in FIG. 13 or a 200/inch (90 degree screen) shown in FIG. 14 with gray level printing. As the output screen stays at a frequency far away from some of the more popular magazine type screen frequencies (133/inch, 150/inch), a moire pattern generated due to the frequency beating of the input and output screens will go to a higher frequency. The moire pattern thus generated will therefore be less observable than the moire created by two frequencies that are close to each other, like 141/inch and 150/inch screens. Also, the moire pattern from a halftone input image can be further reduced if the strength of the output screen is lessened (e.g., by a partial dot as in FIG. 10 or a mixed dot as in FIG. 11). Of course, a balance is made between reducing the moire and the granularity that is generated from a continuous tone image with a certain toner size. In any event, the granularity for these higher screen systems with continuous tone input would still be better than that of just contour suppression on each pixel since a weak screen is provided to stabilize the system. Contour suppression on the halftone may still be necessary for a high screen in order to generate enough gray levels to reduce contouring. Text screening at 282/inch screen has also been shown to be quite satisfactory.

The above two methods provide a default mode for universal color document digital copying in addition to a photographic mode which can produce very good output with photographic input. Namely, the default mode will preserve text/graphics, halftone with the least moire and reasonable photographic pictorial inputs. Although the default mode can reproduce photographic input reasonably well, it is preferred that this default mode be supplemented by a photographic mode which deals with continuous tone input very well.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An apparatus for reproducing an original image, comprising:
   a scanner which scans and digitizes the original image into pixels;
   a controller coupled to the scanner to receive the digitized original image, and which produces a first signal corresponding to a gray level halftoned representation of the digitized original image;
   a printer coupled to the controller to receive said first signal and which produces a gray level halftoned reproduction of the original image;
   wherein the controller includes means for operating the printer in a mode wherein contour suppression is applied to every pixel of said original image and wherein in said mode each pixel has an input pixel gray value and is assigned an output gray level and wherein the contour suppression includes assigning for each pixel having an input pixel gray value that is between first and second threshold levels a probability of having the first output gray level and a probability of having the second output gray level, said first and second threshold values being selected from a set of threshold values representing possible threshold values assigned for a pixel matrix location corresponding to a position of the pixel in a halftone matrix cell and wherein the number of members of the set corresponds to the number of output gray values.

2. The apparatus of claim 1, wherein the probability is assigned as a function of a difference of the input pixel gray value to the first and second threshold levels.

3. The apparatus of claim 1 and wherein said mode is a default mode.

4. The apparatus of claim 1 and wherein the values in said set of threshold values are part of a mixed dot threshold values plural matrix set.

5. The apparatus of claim 10 and wherein the values in said plural matrix set are derived from a four quadrant tone reproduction operation.

6. A method of reproducing an original image, comprising:
   scanning said original image to produce a signal representing a digitized original image;
   performing contour suppression on every pixel of said digitized original image;
   controlling a gray level printer to print the digitized original image after contour suppression has been performed; and
   wherein each pixel has an input pixel gray value and is assigned an output gray level and wherein the contour suppression includes assigning for each pixel having an input pixel gray value that is between first and second threshold levels a probability of having the first output gray level and a probability of having the second output gray level, said first and second threshold values being selected from a set of threshold values representing possible threshold values assigned for a pixel matrix location corresponding to a position of the pixel in a halftone matrix cell and wherein the number of members of the set corresponds to the number of output gray values.

7. The method of claim 6, wherein the probability is assigned as a function of a difference of the input pixel gray value to the first and second threshold levels.

8. The method of claim 6 and wherein the values in said set of threshold values are part of a mixed dot threshold values plural matrix set.

9. The method of claim 8 and wherein the values in said plural matrix set are derived from a four quadrant tone reproduction operation.

10. A method of reproducing an original image that contains a halftone screened region, comprising:
    scanning said original image to produce a signal representing a digitized original image, said original image having a screen frequency of 150 lines per inch or less;
    processing said signal to produce a gray level signal for each output pixel;
    controlling a gray level printer to print the digitized original image with an output screen frequency higher in screen frequency than the screen frequency of the original image, the higher screen frequency being at least 200 lines per inch and substantially higher in frequency than the underlying screen frequency subsisting as a remnant in the image printed by the printer to minimize the creation of moire patterns in the image printed by the printer.

11. The method of claim 10 and wherein in said processing step said gray level signal for each output pixel is determined by comparing a scanned value of a corresponding pixel in the original image with threshold values in a mixed dot threshold value mask.

* * * * *